United States Patent [19]

Debnath et al.

[11] Patent Number: 5,666,537
[45] Date of Patent: Sep. 9, 1997

[54] POWER DOWN SCHEME FOR IDLE PROCESSOR COMPONENTS

[75] Inventors: Kathakali Debnath, Beaverton; Anurag Sah, Aloha, both of Oreg.; Cong Quoc Khieu, San Jose, Calif.

[73] Assignee: Intel Corporation, Santa Clara, Calif.

[21] Appl. No.: 289,928

[22] Filed: Aug. 12, 1994

[51] Int. Cl.$^6$ ..................................................... G06F 1/32
[52] U.S. Cl. .................. 395/750.04; 395/800.32
[58] Field of Search ................................. 395/750, 800, 395/375; 364/707

[56] References Cited

U.S. PATENT DOCUMENTS

| | | | |
|---|---|---|---|
| 5,392,437 | 2/1995 | Matter et al. | 395/750 |
| 5,420,808 | 5/1995 | Alexander et al. | 364/707 |
| 5,452,401 | 9/1995 | Lin | 395/750 |
| 5,452,434 | 9/1995 | MacDonald | 395/550 |
| 5,457,790 | 10/1995 | Iwamura et al. | 395/494 |
| 5,481,733 | 1/1996 | Douglis et al. | 395/750 |

*Primary Examiner*—Jack B. Harvey
*Assistant Examiner*—Sumati Lefkowitz
*Attorney, Agent, or Firm*—Blakely, Sokoloff, Taylor & Zafman

[57] ABSTRACT

Power down circuitry in a processor for controlling power delivered to functional units of the processor, comprising first and second power down circuits. The first power down circuit comprises a state machine having a decoded instruction as input and a control signal as output. The control signal disables a clock signal to a floating point unit (FPU) when the decoded instruction is not a floating point instruction. The second power down circuit comprises a prediction circuit that generates a predict signal when a cache access cannot occur. The predict signal disables a clock signal to a cache.

11 Claims, 6 Drawing Sheets

POWER DOWN SCHEME FOR IDLE PROCESSOR COMPONENTS

BACKGROUND OF THE INVENTION

1. Field of the Invention

This invention relates to computer systems and, more particularly, to power management within a processor of a computer system.

2. Art Background

As modern computer programs have become increasingly more sophisticated, modern personal computer systems have also had to become more sophisticated in order to accommodate these computer programs. Computer programs are larger than they once were and therefore are made up of a larger number of code instructions than were previous computer programs. Furthermore, on average, modern computer programs require access to larger files of data that are read from, and written to, when executing the programs.

Data and instructions are typically stored within the computer system and provided to the microprocessor over one or more relatively fast bus systems. Because most types of relatively fast random access memory are both volatile and relatively expensive, a computer system usually stores code and data on relatively inexpensive, nonvolatile memory such as a floppy disk or a hard disk. The nonvolatile memory has a relatively slow access speed, however, so the typical computer system also has a main memory comprising volatile memory that has a relatively faster access speed.

When a program is to be executed, the computer system uses a technique known as shadowing to copy the code and data required to execute the program from the slow nonvolatile memory to the faster volatile memory. The shadow copy in the main memory is then used to execute the program. If any changes are made to the shadow copy during the course of the program execution, the modified portion of the shadow copy is copied back to the slower nonvolatile memory. Typically, it is only the data (and not the program itself) that changes and is copied back to the nonvolatile memory.

The heart of a personal computer system is usually a central processing unit (CPU) that resides on a microprocessor chip. New microprocessor chips that operate at increasingly high operating speeds are constantly being developed in order to permit personal computers to execute the increasingly larger programs in a timely manner. Usually, these microprocessor chips are developed using CMOS (complementary metal-oxide semiconductor) technology. CMOS chips are characterized by their relatively low power consumption. The greatest amount of power consumption within a CMOS chip occurs on the leading and trailing edges of clock pulses (i.e., when a clock signal transitions from a low voltage state to a high voltage state, or vice versa). When the operating speed of the microprocessor is increased, the number of clock pulses in a particular time period also increases thereby increasing the power consumption of the microprocessor during this time period. Furthermore, as the power consumption of the microprocessor increases, additional heat is generated by the microprocessor. This additional heat must be dissipated in order to prevent heat related damage to components within the computer system.

Both power consumption and heat dissipation pose serious problems when designing a personal computer system. This is especially true in the case of mobile computers that typically are powered by batteries. The more power that the computer consumes, the less time that the computer can operate using a given sized battery. Therefore, as the operating speed of the computer is increased, a designer of a battery powered computer system is faced with several unattractive alternatives. If the same sized batteries are used, then the effective operating time for the computer system must decrease when the operating speed is increased. On the other hand, it is desirable for the effective operating time to remain constant (or, better yet, to be increased). In such a case, one must either add additional batteries, thereby increasing the bulk and weight of the computer, or use an exotic, and therefore expensive, battery technology (or both).

The trend in mobile computers is towards smaller, faster, less expensive and lighter units. Thus, the need to add additional batteries, or to add more expensive batteries, is a significant disadvantage. This disadvantage is exacerbated by the need to add cooling fans, or to implement other cooling techniques, in order to dissipate the additional heat that is generated by a high speed microprocessor.

Additionally, when a microprocessor operates at a higher speed, it can execute more instructions in a given amount of time. Therefore, the microprocessor can also process a greater amount of data during that period. This means that computer instructions and data must be supplied to the microprocessor chip at increasingly greater speeds for the higher speed of the microprocessor to be utilized effectively. Thus a bottle neck has developed in computer systems having fast microprocessors. This bottle neck is the bus that provides instructions for the microprocessor to execute and that also provides the data that the microprocessor will use when executing these instructions.

If the next instruction to be executed is not available when the microprocessor needs it, then the microprocessor must wait idly while the required instruction is retrieved and provided to the microprocessor. Typically, the microprocessor clock continues to toggle during this idle time, thereby needlessly consuming power and generating heat that must be dissipated. This idling can also occur, even when the microprocessor has the next instruction to be executed available, if the next instruction to be executed requires data that are not immediately available to the microprocessor. Once again, the microprocessor must wait one or more clock cycles (i.e., insert wait cycles) until the data are retrieved before the next instruction can be executed.

In order to decrease the frequency with which the microprocessor encounters these wait cycles, many modern high performance microprocessors have a small internal cache. The internal cache is also sometimes called a primary cache. Instructions that are likely to be executed, and data that are likely to be needed by the executing instructions, are stored in the internal cache so that they may be accessed immediately by the CPU of the microprocessor. Frequently, high speed microprocessors have two internal caches: an instruction cache for storing instructions and a data cache for storing data.

An instruction cache works according to the principle of localization. The sequential nature of computer programs is such that when a particular instruction within the program is executed, it is highly probable that the next instruction to be executed will be the instruction that follows the currently executing instruction. Therefore, when an instruction is to be executed, the instruction cache is checked to determine whether a copy of the required instruction is immediately available within the cache. A cache hit occurs if a copy of the required instruction is stored within the instruction cache. If there is a cache hit, then there is no need for the CPU to wait while the instruction is retrieved from wherever it is stored in the computer system. The copy of the instruction can be supplied to the CPU immediately from the instruction cache.

On the other hand, a cache miss occurs if a copy of the required instruction is not stored within the instruction cache. In the case of a cache miss, the CPU must wait while the instruction is retrieved from wherever it is stored within the computer system. Actually, rather than only retrieving the next instruction to be executed, a cache line is formed by retrieving the next instruction to be executed and a certain number of instructions following the next instruction to be executed. This is done because there is a high probability that the subsequent instructions will be executed. Then, if the subsequent instructions are in fact required to be executed, they will be immediately available to the CPU from within the cache line of the instruction cache. Of course, if every line of the cache is full when a new line is retrieved, the new line will replace one of the lines currently stored within the instruction cache. Several cache line replacement schemes exist, typical of these is the least recently used (LRU) cache line replacement method.

A data cache works similarly to the way that an instruction cache operates. Because of the sequential nature of programs, the concept of localization also applies to data used by the programs. If a piece of data is required by the CPU, there is a high probability that the next piece of data required by the CPU will be the piece of data stored immediately following the currently required piece of data. Therefore, if a cache miss occurs in the data cache, a cache line (that contains the currently required piece of data and a certain number of pieces of data that follow it) is retrieved and stored in the data cache. Thus, there is a high probability that the next piece of data required will be stored in the new cache line and a cache hit will occur.

Another way to increase performance of a processor is to provide a floating-point unit (FPU) to supplement the CPU. The FPU is specialized circuitry that performs calculations using floating point numbers, as opposed to integers (whole numbers). Adding a FPU to a microprocessor can dramatically speed up math and graphics functions (graphics work is generally math intensive). The performance is only enhanced, however, in the case of programs that are designed to recognize that the microprocessor has a FPU and then issue floating point instructions to utilize the FPU. Many microprocessors, however, do not have a FPU. Therefore, many programs do not attempt to exploit the benefits of a FPU by including floating point instructions. When these programs are executed by a microprocessor that has a FPU, the FPU is idle because it does not have any floating point instructions to process. Even in the case of a program that uses floating point instructions, the FPU can be idle if there are sections within the program where no floating point instructions are issued because none are required. Even though the FPU is idle, it continues to be clocked and therefore continues to consume power and generate excess heat.

Similarly, there can be times when a processor is active, but a cache is not required. At such times, power is still provided to the cache.

SUMMARY AND OBJECTS OF THE INVENTION

Therefore, one object of the present invention is to provide a processor which reduces the amount of power that it consumes.

It is also an object of this invention to provide a processor which reduces the amount of power that it consumes without degrading the performance of the processor.

It is also an object of this invention to reduce power consumption by providing a processor which enables processor components when they are needed and disables processor components when they are not needed.

It is also an object of this invention to reduce power consumption by providing a processor which predicts when a processor component will not be needed and disables the processor component when it is not needed.

It is also an object of this invention to achieve the above objects automatically within the processor in a manner that is transparent to the user and that is transparent to other components within the computer system.

A processor is described that has dynamic local power management. To reduce the power consumption of the processor, component clocks are gated so that components of the processor are powered down when they are not needed. Thus, in the absence of a floating point instruction to execute, the floating point unit of the processor is powered down. Furthermore, an interrupt controller that is internal to the processor is powered down when idle.

Moreover, the code and data caches of the processor are also powered down when idle. On each cycle, a predictive mechanism is used to determine at an early stage within the cycle whether a cache access will be required during the next cycle. The cache is then powered down if it is predicted that there will not be a cache access.

Other objects, features, and advantages of the present invention will be apparent from the accompanying drawings and from the detailed description which follows below.

BRIEF DESCRIPTION OF THE DRAWINGS

The objects, features, and advantages of the present invention will be apparent from the following detailed description of the invention in which.

DETAILED DESCRIPTION

In the following description, for purposes of explanation, specific numbers, materials and configurations are set forth in order to provide a thorough understanding of the present invention. It will be apparent to one skilled in the art, however, that the present invention can be practiced without these specific details. In other instances, well known systems are shown in diagrammatic or block diagram form in order not to obscure the present invention unnecessarily.

Figure 1:
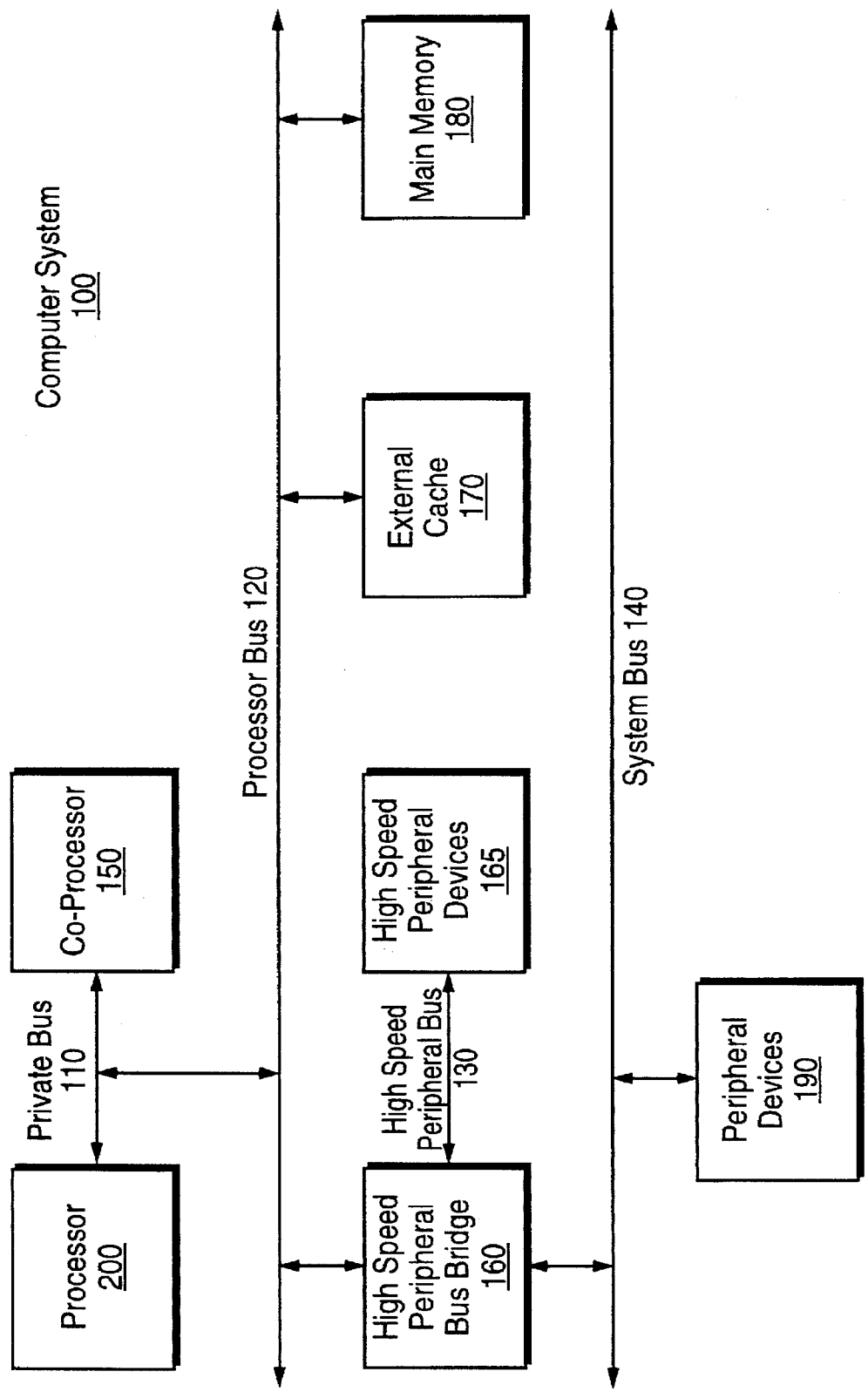
FIG. 1 illustrates a block diagram of a computer system having a processor that has internal circuitry to automatically power down idle processor components.

FIG. 1 illustrates a block diagram of a computer system having a processor that employs circuitry power down idle components until they are needed. In FIG. 1, computer system 100 is a multiprocessor system wherein processor 200 is coupled to co-processor 150 by private bus 110. Private bus 110, in turn, is coupled to processor bus 120. External cache 170, main memory 180 and high speed peripheral bus bridge 160 are also coupled to processor bus 120. Low speed peripheral devices 190 are coupled to high speed peripheral bus bridge 160 by system bus 140. Additionally, high speed peripheral devices 165 are coupled to high speed peripheral bus bridge 160 by high speed peripheral bus 130.

It is to be understood that the architecture of computer system 100 is merely representative of a wide class of computer system architectures in which the present invention can be practiced.

For one embodiment, processor 200 can be placed into a low power consumption state. Furthermore, processor 200 has an internal write-back cache that can be snooped by co-processor 150 when processor 200 is in the low power consumption state. Moreover, processor 200 can be snooped by direct memory access devices (such as peripheral devices 190 and high speed peripheral devices 165) when processor 200 is in the low power consumption state. Further details regarding the low power snooping capability can be found in co-pending U.S. patent application Ser. No. 08/269,447, Debnath, filed Jun. 30, 1994, entitled "Low Power Snooping For A Processor Having An Internal Write-Back Cache".

Processor 200 has circuitry to disable idle components within processor 200 until the idle components are needed. With the exception of the circuitry to disable idle components within processor 200 until the idle components are needed, the internal write-back cache of processor 200 operates in a manner that is well known in the art. Furthermore, with the exception of the circuitry to disable idle components within processor 200 until the idle components are needed, the components of computer system 100 operate in a manner that is well known in the art. Therefore, the operation of computer system 100 will not be discussed further except to describe how the operation of the components of computer system 100 affects the operation of the circuitry to disable idle components within processor 200 until the idle components are needed.

For an alternate embodiment, co-processor 150 also has circuitry to withhold power from idle components within co-processor 150 until the idle components are needed. This alternate embodiment will not be discussed further, however, because the operation of the circuitry to disable idle components within co-processor 150 until the idle components are needed would be similar to the operation of the circuitry of processor 200.

For yet another alternate embodiment, computer system 100 is a uniprocessor system. For this alternate embodiment, computer system 100 would not include co-processor 150 or private bus 110. Instead, processor 200 would be coupled directly to processor bus 120.

Figure 2:
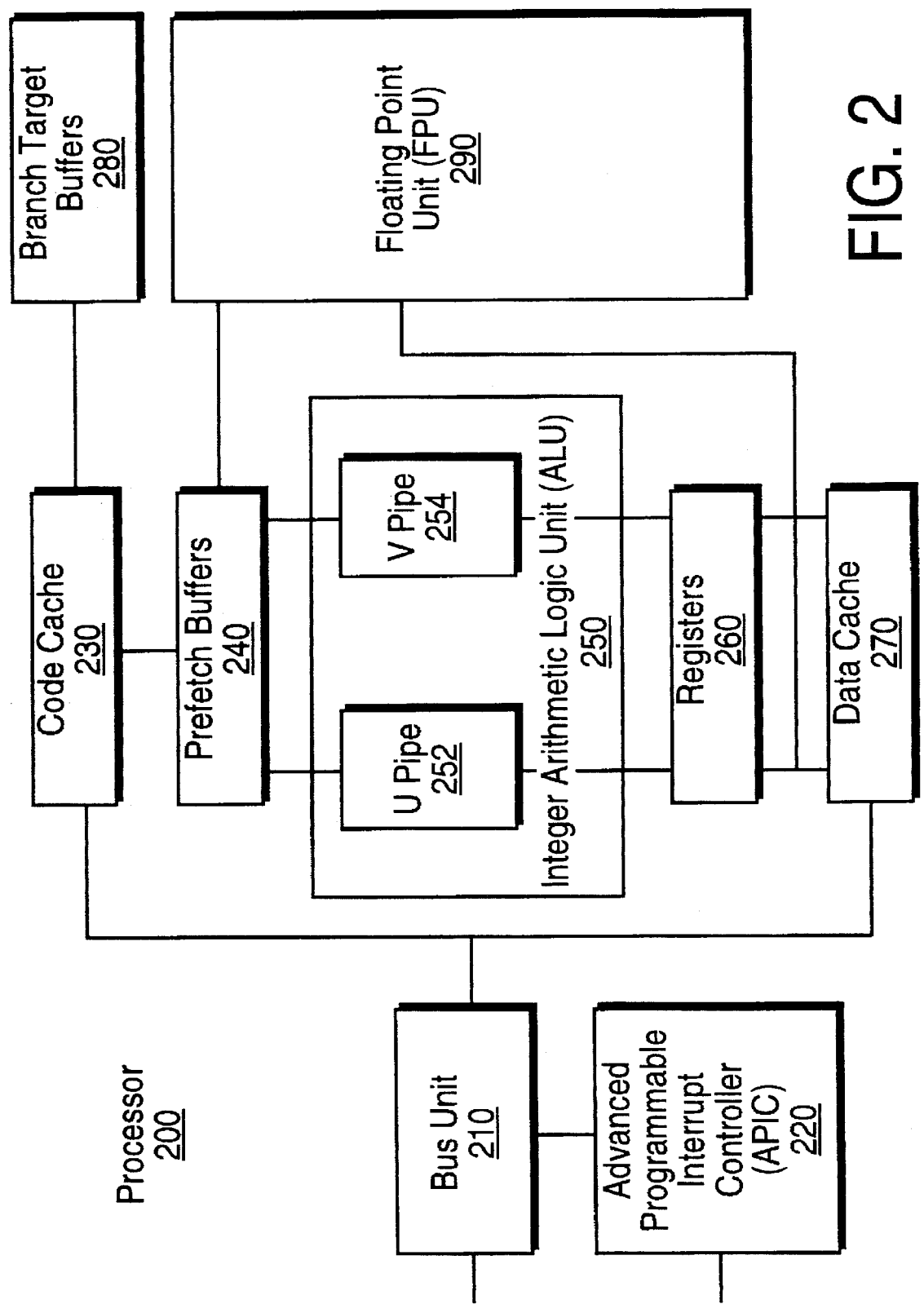
FIG. 2 illustrates a high level block diagram of the processor having the internal circuitry to automatically power down idle processor components.

FIG. 2 illustrates a high level block diagram of the processor 200. In FIG. 2, it can be seen that processor 200 is a superscalar processor having an internal cache. In the embodiment of processor 200 illustrated in FIG. 2, processor 200 can execute as many as three instructions simultaneously. Processor 200 accomplishes this by executing one floating point instruction in floating point unit (FPU) 290 while it is also executing two integer instructions in integer arithmetic logic unit (ALU) 250. In such a case, one integer instruction is executed in U pipe 252 of ALU 250 while the other integer instruction is executed in V pipe 254 (also of ALU 250). For one embodiment, processor 200 has circuitry that identifies periods of time when FPU 290 will be idle. During these idle periods, FPU 290 is powered down.

In FIG. 2, processor 200 is depicted as having two internal caches: code cache 230 and data cache 270. For one embodiment, both code cache 230 and data cache 270 are disabled by processor 200 when they are idle. Alternately, only code cache 230 or data cache 270 are disabled by processor 200 when idle. For yet another embodiment, code cache 230 and data cache 270 are combined into a single internal cache that stores both code and data and the single cache are disabled by processor 200 when it is idle.

Furthermore, for one embodiment, code cache 230 and data cache 270 are set associative caches. Alternately, code cache 230 and data cache 270 are direct mapped or fully associative caches. Each of these types of caches are well known in the art and will not be discussed further except to note that the processor 200 can power down caches 230 and 270 regardless of the type of cache mapping scheme that is being used.

Although processor 200 is depicted as being a superscalar processor, it is to be understood that it is not necessary that processor 200 be a superscalar processor in order to practice the withholding of power to idle components of processor 200.

With the exception of having the ability to power down to idle components, the operation of a processor such as processor 200 is well known in the art and will therefore not be discussed in great detail. Basically, data, instructions and commands enter processor 200 through bus unit 210. Also, computational results generated by processor 200 leave processor 200 through bus unit 210. External interrupts enter processor 200 through advanced programmable interrupt controller (APIC) 220. When APIC 220 receives an interrupt, APIC 220 notifies bus unit 210 and the normal operation of processor 200 is suspended while processor 200 responds to the interrupt. For one embodiment, processor 200 has circuitry that identifies periods of time when APIC 220 will be idle. During these idle periods, APIC 220 is powered down.

Thus it can be seen that, for at least one embodiment, processor 200 employs two different categories of power reduction techniques: macro-level software/system usable power management and micro-level dynamic software/system transparent methods.

In the first category, processor 200 provides software and hardware hooks to the operating system and the system hardware, allowing them to power down processor 200 when it will not be needed. One of the means by which this is achieved is a hardware interrupt pin, STPCLK. Assertion of this pin by the system hardware causes processor 200 to transition to the low power state after completion of outstanding activities. Another way of achieving the low power state is by virtue of execution of the HLT software instruction. Upon execution of the HLT instruction, processor 200 transitions to a low power state. Operating systems can execute this instruction, for example, while waiting for response from a slow input/output (IO) device.

The second category consists of dynamic local power management. Components of processor 200 are powered down to reduce the power consumed. Floating Point Unit 290 is powered down in the absence of a floating point instruction. Furthermore, both the code 230 and the data 270 caches are powered down using an intelligent predictive algorithm that determines at an early stage whether a cache access cycle will be run and powers down the cache appropriately. Moreover, on chip interrupt controller APIC 220 is also powered down when idle.

Thus, as a first approach, processor 200 automatically, internally, controls the power consumed by its components. As a second approach, processor 200 provides hardware and software hooks so that it can be ordered externally to a low power state as part of the system design. The two approaches complement each other. The hooks for system designers and software writers are easily used to place processor 200 into a low power state when they deem that it would be desirable to do so. The automatic features, on the other hand, work in a manner that is transparent to the user when processor 200 is not in the low power mode and certain conditions are met.

Figure 3:
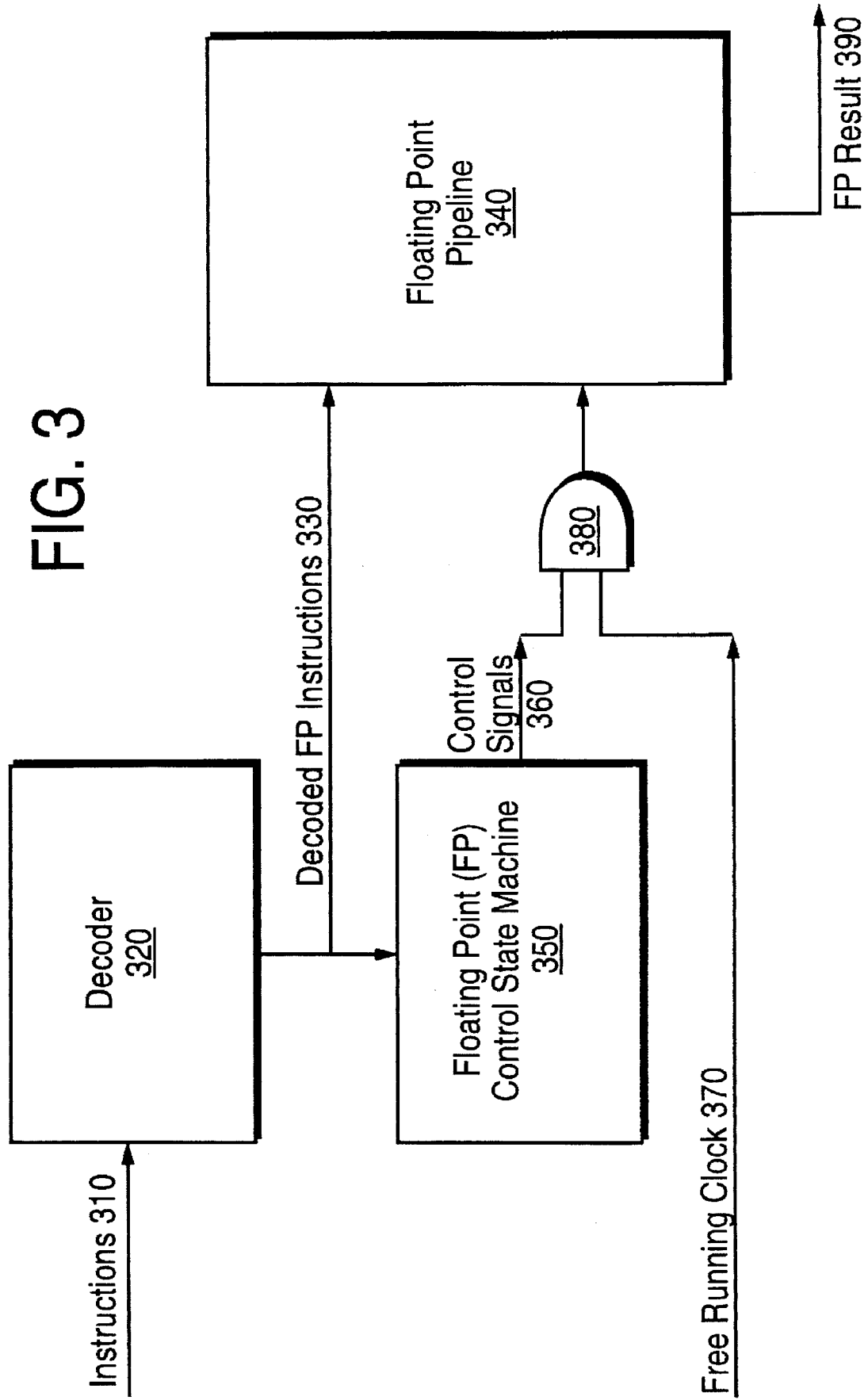
FIG. 3 illustrates a detailed block diagram of automatic floating point unit power down circuitry of the processor.

FIG. 3 illustrates a detailed block diagram of automatic floating point unit power down circuitry of the processor. This scheme falls under the category of micro-level system/software invisible power management. In FIG. 3, it can be seen that instructions 310 enter decoder 320 where they are decoded. In turn, the decoded floating instructions 330 are provided by decoder 320 to floating point pipeline 340 and to floating point control state machine 350. Based upon the decoded floating point instructions 330, floating point control state machine 350 provides control signals 360 to floating point pipeline 340. Control signals 360 control progress of each decoded floating point instruction 330 through floating point pipeline 340 until a floating point result 390 is output from pipeline 340. For one embodiment of processor 200, Floating Point Unit (FPU) 290 is an integral part of the chip and shares part of the integer pipeline.

The power saving technique employed in FPU 290 is to use AND gate 380 to disable free running clock 370 to floating point pipeline 340 when no floating point instructions are being executed. This results in significant power savings for applications that are not floating point intensive. Free running clock 370 is enabled when decoder 320 decodes a floating point instruction. A part of the floating point control unit 350 keeps track of the progress of the instructions through the floating point pipeline 340, and is always clocked. The output control signals 360 are signals that indicate there is an active floating point instruction in the pipeline 340. As long as any one of these signals are asserted, the floating point pipeline 340 is clocked. Once it is indicated that the FPU has gone back into an idle state (i.e., there are no more instructions in pipeline 340), the control signals 360 are shut down, and the floating point control unit logic 350 waits for the next floating point instruction to be decoded. Because there is no latency associated with powering up the FPU, it is totally transparent to the external user.

During the fetch stage, one does not know what type of instruction is being fetched. There is one decoder for both the integer and the floating point pipelines. If an integer instruction is decoded, it is sent off to the integer arithmetic logic units (ALUs). If a floating point instruction is decoded, decoder 320 sends the instruction off to floating point pipeline 340. At the end of the decode stage is the point where floating point pipeline 340 has power restored if a floating point instruction has been decoded. Between the decode and the execution stages, floating point pipeline 340 has enough time to power up.

Thus, floating point pipeline 340 is powered down until decoder 320 identifies a floating point instruction. Once the floating point instruction retires from floating point pipeline 340, pipeline 340 will remain powered if another floating point instruction has been decoded. On the other hand, if another floating point instruction has not been decoded, then floating point pipeline 340 will be powered down until the next instruction is detected by decoder 320.

For one embodiment, floating point pipeline 340 is considerably deeper than the integer pipeline, and compatibility requirements mandate precise exceptions and in-order execution of instructions. This means that if an instruction faults, then instructions following it cannot execute until the fault handler has been executed. In order to avoid substantial performance loss by stalling instructions until the status of a preceding instruction is known, a mechanism called SIR (Safe Instruction Recognition) is implemented in this embodiment. The SIR mechanism determines whether a floating point instruction is guaranteed to complete without faulting (some are), and such instructions are called "safe." Further details regarding a safe instruction recognition mechanism can be found in U.S. Pat. No. 5,307,301, Sweedler, issued Apr. 26, 1994, entitled "Floating Point Safe Instruction Recognition Method".

Safe instructions proceed normally through floating point pipeline 340. If an instruction is deemed "unsafe" however, instructions following the unsafe instruction are stalled until the unsafe instruction retires from floating point pipeline 340. The number of cycles taken by the unsafe instruction to retire is variable, depending upon the type of instruction (e.g., divides take longer than adds), and whether the instruction will actually fault or not. In such situations, although the floating point pipeline 340 seems idle, in reality pipeline 340 is stalled. Pipeline 340 will remain stalled while either of two cases remain in effect. In the first case, pipeline 340 will remain stalled while the unsafe instruction is proceeding normally to its execution retirement stage. In the second case, the unsafe instruction has faulted and pipeline 340 will remain stalled while the micro code is performing the fault handling process prior to the exception being reported. Free running clock 370 is enabled in.

The automatic power down of the floating point unit 290 when it is idle is not the same as processor 200 being ordered into a low power state. Unlike in the low power state, when the idle floating point unit 290 has been powered down, the rest of processor 200 is powered, perhaps processing integer instructions, even though pipeline 340 is not powered because there are no floating point instructions to process. Similarly, the on chip interrupt controller APIC 220 also can power down when idle while the rest of processor 200 is active.

The low latency associated with powering up and down of FPU 290 makes the process deterministic. Thus, if FPU 290 is not required for a period, one can power it down confidently because one knows that it can be powered up again in time to be available when it is next required.

On the other hand, other portions of processor 200 have a latency associated with restoring power to them that introduces a stochastic element into the process of powering them down when they are idle. An example of this can be found in powering down instruction 230 and data 270 caches of processor 200.

Instruction 230 and data 270 caches employ a per cycle dynamic power conserving technique. For one embodiment, cache cycle requests are generated one clock prior to the cycle in which they are run. Due to tight timing restrictions, information regarding whether a cache cycle is required is generally available very late in the clock cycle. A predictive mechanism has been developed and implemented in processor 200 to control the timer and associated logic in the caches by generating a cycle prediction for the subsequent clock. The scheme divides the factors for cache cycles into events and qualifiers. A cache clock cycle predict signal is generated based on a sufficient set of the events and qualifiers. This scheme provides significant power savings.

In order to not negatively impact the performance of processor 200, the prediction mechanism employed guarantees that any cache cycle which should be run is not mispredicted. A positive prediction when a cycle may not eventually run causes no functional harm but relates directly to power savings. This is referred to as a false positive prediction. Table 1 represents possible cases more succinctly.

TABLE 1

| Prediction | Actual Event | |
|---|---|---|
| Cycle | Cycle run | Correct prediction |
| Cycle | Cycle not run | Incorrect prediction. No harm done. Some power lost |
| No Cycle | Cycle run | Incorrect prediction. Must never happen |
| No Cycle | Cycle not run | Correct prediction |

The decision to run a cache cycle depends on a number of factors. The mechanism described below relies on utilizing appropriate factors as the basis for the decision.

A cache cycle (C) is generated from two classes of conditions. The first class comprises of events (E) while the second comprises of qualifiers (Q). Thus, one can represent this cache cycle by the set C<–(e1,e2, . . . ,em,q1,q2 . . . ,qn).

Events are early signals directly related to cache cycle request conditions. Events get qualified with relatively late "okay-to-run" indicators. These indicators, referred to as qualifiers, can prevent the cache cycle from running due to various reasons (e.g., a freeze condition in the execution pipeline). A prediction scheme maps the entire set of events and a subset of qualifiers to generate a cycle prediction (Cp).

$$Cp \leftarrow (e1, e2 \ldots, em, q1, q2, \ldots, qk),$$

where k<=n

At the minimum, the set Ce<-(e1,e2, ... ,em) satisfies the necessary conditions for prediction. This set also has the additional property that it excludes false negative predictions (i.e., the set Ce is a sufficient set). The prediction set, Cp, lies in between the sets Ce and C. Hence, prediction set Cp conforms to the conditions stipulated in Table 1.

The probability of false positive prediction varies with the size and choice of the subset of qualifiers used in the prediction set. Increasing the number of qualifiers decreases the probability of false positive predictions. This relates directly to the amount of power saved because false positives imply power loss. The choice of qualifiers also depends on the arrival time of the qualifiers. An appropriate choice based on power and prediction delay trade-offs is made.

The following example illustrates an implementation of the prediction scheme as applied to the data cache 270 read cycle. Depending on the design, data cache 270 performs several kinds of cycles (e.g., read, write, replace, invalidate). One of several events within processor 200 triggers these cycles. These events are conditioned with qualifiers that may prevent them from generating a cache 270 cycle.

Figure 4:
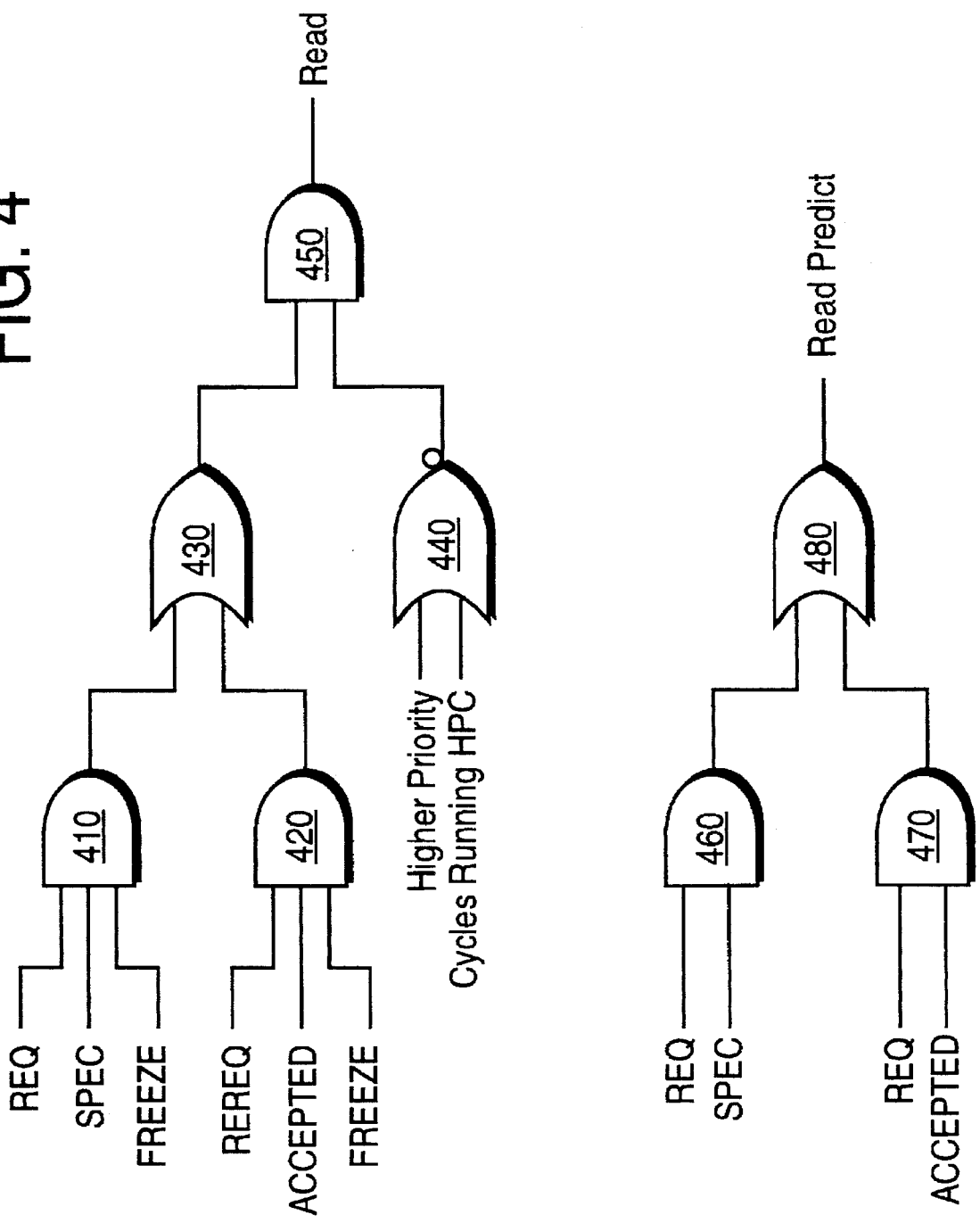
FIG. 4 illustrates cache read predict logic for automatic cache power down circuitry of the processor.

FIG. 4 illustrates cache read predict logic for automatic cache power down circuitry of the processor. The cache 270 read cycle has its origin in a data request made by an instruction in the execution pipe. This is an example of a necessary condition. This condition is represented by the logical AND 460 of the request signal (REQ) with a cycle specification signal (SPEC). The cycle request however, may not be accepted by the cache if freeze conditions (FREEZE) occur, e.g., a simultaneous translation lookup buffer (TLB) lookup miss (AND 410). The freeze indicator arrives late in the cycle. It represents an element of the qualifier set. Another necessary set term may occur if the cache cycle request was accepted previously (AND 470) but was not run due to freeze conditions. This term is represented by the logical AND 420 operation of the latched request with the freeze indicator and a term that indicates that the previous request was accepted but could not be run. The final read cycle is generated by qualifying (AND 450) it (OR 430) with the fact that none of the other higher priority cycles are running (NOR 440). In this example, the set consists of:

C=(REQ, SPEC, FREEZE, REREQ, ACCEPTED, HPC)
Ce=(REQ, SPEC, REREQ)
Cq=(FREEZE, ACCEPTED, HPC)
Cp=(REQ, SPEC, REREQ, ACCEPTED)

Thus, FIG. 4 shows the read predict indicator generated from the set Cp. Using the above prediction scheme, the predict signal is generated and used by the caches to save power during cycles with no cache activity. The predict signal is used in the cache self timer and the clock buffer.

Figure 5:
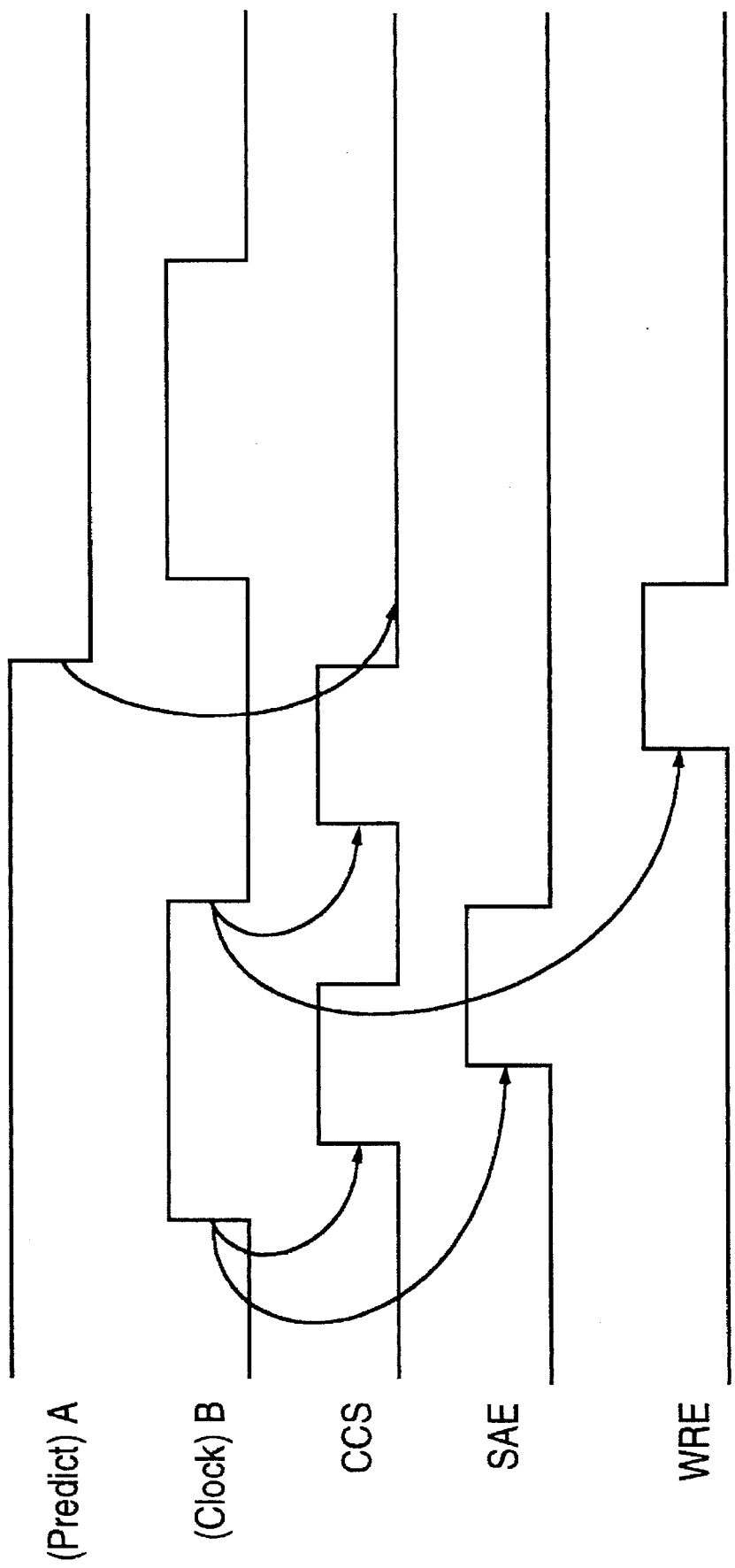
FIG. 5 illustrates timing wave forms for cache signals of the processor.
Figure 6:
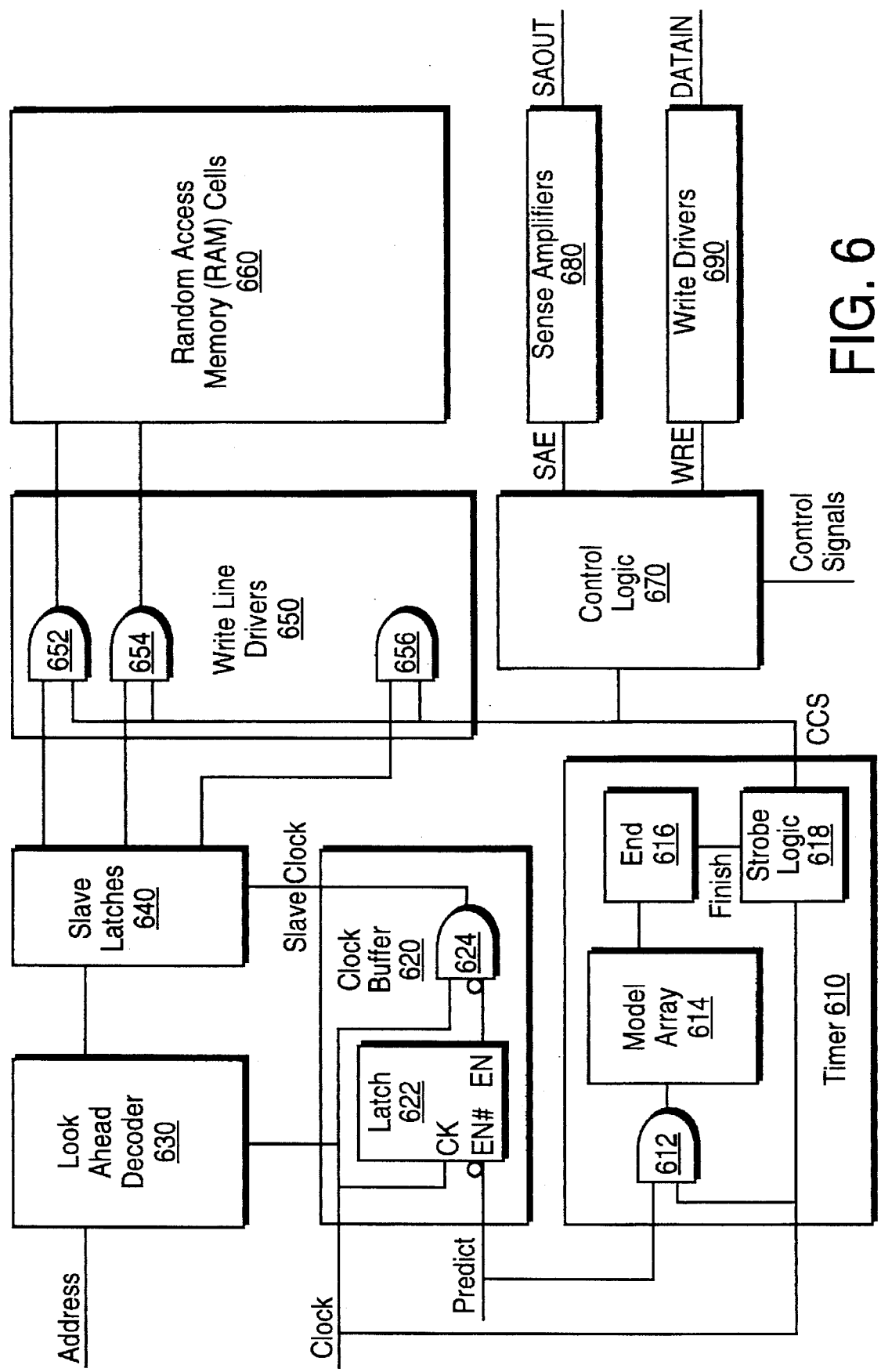
FIG. 6 illustrates a block diagram of the internal cache of the processor.

FIG. 5 illustrates timing wave forms for cache signals of the processor and FIG. 6 illustrates a block diagram of the internal cache of the processor.

Timer 610 is one of the most important circuits in cache 600 because timer 610 generates all signals that control RAM 660 activities and because timer 610 controls the races between these control signals. A pipelined timer architecture is chosen because it tracks a real array reasonably well and provides the flexibility to adjust timing. Timer 610 generates a CCS pulse (Centralized Controlling Signal) at clock transition. The CCS pulse during clock high is for a read operation and the CCS pulse during clock low is for a write operation. The logic from the control block 670 then determines what RAM 660 activity is requested and asserts the correct enabling signals: Sense amplifiers 680 enable (SAE) for reads and Write drivers 690 enable (WRE) for writes. FIG. 6 depicts the interaction between timer 610 and rest of cache 600. The associated signals are illustrated in FIG. 5.

Conceptually, timer 610 can be considered to be a one column RAM circuit (model array 614). Timer 610 has the same sense amplifier, write driver and decoder circuit functionality as in the regular array circuits. Timer 610 also has an additional end detection circuit 616. End detection circuit 616 determines when the read or write activity occurs and asserts the FINISH signal to strobe logic 618 to turn off the CCS pulse and timer 610 itself. Because timer 610 needs to be activated early, most of the input signals fail to meet the necessary set-up time requirement. To avoid this constraint, timer 610 is shut off and on with the help of the predict signal PREDICT.

For one embodiment (not shown), clock buffer 620 is made up of simple inverters. Alternately, as shown in FIG. 6, the predict signal PREDICT is also used in clock buffer 620 for additional savings. Clock buffer 620 generates clock signals that enable look ahead decoder 630 and slave latches 640. As soon as the clock goes low, an address is decoded by look ahead decoder 630 and becomes valid. The decoded address is not updated, however, until the slave latches 640 are opened. Because of high loading from the lines in the tag RAM 660, the SLAVE CLOCK for slave latch 640 consumes a significant amount of power. Therefore, clock buffer 620 was changed from simple inverters into a circuit consisting of a simple latch 622 with AND gate 624. Thus, the SLAVE CLOCK signal is a qualified clock and the qualifying signal is the predict signal PREDICT.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. In a processor, power down circuitry for controlling power delivered to functional units of the processor, comprising:

a first power down circuit comprising a state machine having a decoded instruction as input and a control signal as output, the control signal enabling a clock signal to a floating point unit (FPU) when the decoded instruction is a floating point instruction;

a second power down circuit comprising a prediction circuit that generates a control signal as output, the control signal enabling a clock signal to a floating point unit (FPU) when the decoded instruction is a floating point instruction:

a timer circuit coupled to the prediction circuit that generates a cache control signal in response to the predict signal, the cache control signal enabling cache read and write operations;

a clock buffer circuit coupled to the prediction circuit that generates a latching signal in response to the predict signal, the latching signal latching an incoming address to the cache; and a third power down circuit comprising means for determining an active state of an interrupt controller and for enabling a clock signal to the interrupt controller in response thereto.

2. The power down circuit of claim 1, wherein the first power down circuit comprises stall circuitry that detects an unsafe instruction and prevents a next instruction following the unsafe instruction from entering a pipeline of the processor until either the unsafe instruction has retired or a fault handling process initiated by the unsafe instruction has completed.

3. The power down circuit of claim 1, wherein the first power down circuit comprises a decoder unit coupled to the state machine that decodes instructions for transmission to the FPU and to the state machine.

4. The power down circuit of claim 1, wherein the second power down circuit further comprises event signal inputs that indicate that a cache cycle is requested and qualifier signal inputs that indicate that a cache cycle may not occur regardless of the state of the event signal inputs.

5. A computer system comprising:

a bus;

a main memory coupled to the bus;

at least one peripheral device coupled to the bus;

a processor coupled to the bus, the processor including a bus unit coupled to the bus;

an interrupt controller coupled to the bus unit that controls interrupts from the at least one peripheral device;

a cache coupled to the bus unit;

an arithmetic logic unit (ALU) coupled to the bus unit that executes logic and integer instructions;

a floating point unit (FPU) coupled to the bus unit that executes floating point instructions;

a power down circuit that controls power to the FPU, the cache, and the interrupt controller, comprising:

first control circuitry that enables a clock signal to the FPU when an instruction received by the processor is a floating point instruction;

second control circuitry that predicts when a cache access may occur and enables a clock signal to the cache in response thereto, the second control circuitry comprising a prediction circuit having first inputs that indicate a cache cycle request and second inputs that indicate that a cache cycle may not occur, the prediction circuit outputting a prediction signal when the first and second inputs indicate that a cache access may occur;

a timer circuit coupled to the prediction circuit that generates a cache control signal in response to the predict signal;

a clock buffer circuit coupled to the prediction circuit that generates a latching signal in response to the predict signal, the latching signal latching an incoming address to the cache; and third control circuitry that determines an active state of an interrupt controller and enables a clock signal to the interrupt controller in response thereto.

6. The computer system of claim 5, wherein the first power down circuit comprises stall circuitry that detects an unsafe instruction and prevents a next instruction following the unsafe instruction from entering a pipeline of the processor until either the unsafe instruction has retired or a fault handling process initiated by the unsafe instruction has completed.

7. The computer system of claim 5, wherein the first power down circuit comprises a decoder unit that decodes instructions for transmission to the FPU and a state machine coupled to the decoder that generates an FPU control signal, the FPU control signal enabling the FPU clock signal when the decoder decodes an instruction requiring the FPU.

8. A method for powering down components in a processor comprising the steps of:

(a) decoding a floating point instruction;

(b) generating a control signal that enables a clock signal to a floating point unit in response to step (a);

(c) receiving a plurality of event signal inputs that indicate that a cache access is requested;

(d) receiving a plurality of qualifier signal inputs that indicate that a cache access may not occur regardless of a state of the event signals;

(e) determining when a cache access may occur based upon the event signal inputs and the qualifier signal inputs;

(f) generating a predict signal enabling a clock signal to the cache when the cache access may occur;

(g) enabling a clock signal to an interrupt controller when an interrupt is to be initiated.

9. The method of claim 8, wherein the step of enabling the clock signal to the interrupt controller comprises the steps of:

determining if the interrupt controller will be active;

enabling the clock to the interrupt controller when the interrupt controller will be active.

10. The method of claim 9, further comprising the steps of:

transferring an address to the cache using the predict signal;

enabling cache write operations and cache read operations using the predict signal.

11. The method of claim 8, further comprising the steps of:

detecting an unsafe instruction received by the processor;

preventing a next instruction following the unsafe instruction from entering a pipeline of the processor;

releasing the next instruction for execution when either the unsafe instruction has retired or a fault handling process initiated by the unsafe instruction has completed;

enabling the clock signal to the FPU during the step of preventing.

* * * * *